(12) United States Patent
Venugopal et al.

(10) Patent No.: US 9,734,855 B1
(45) Date of Patent: Aug. 15, 2017

(54) DATA WRITER GAP MATERIAL WITH DECREASED PROTRUSION

(71) Applicant: Seagate Technology LLC, Cupertino, CA (US)

(72) Inventors: Vijayaharan A. Venugopal, Londonderry (GB); Beverley R. McConnell, Londonderry (GB); Marcus B. Mooney, Letterkenny (IE); Mark A. Gubbins, Quigley's Point (IE)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/202,704

(22) Filed: Jul. 6, 2016

Related U.S. Application Data

(60) Provisional application No. 62/197,426, filed on Jul. 27, 2015.

(51) Int. Cl.
*G11B 5/33* (2006.01)
*G11B 5/60* (2006.01)

(52) U.S. Cl.
CPC .............. *G11B 5/6082* (2013.01); *G11B 5/33* (2013.01)

(58) Field of Classification Search
CPC .................................. G11B 5/33; G11B 5/127

USPC ...... 360/125.3, 125.03, 317, 125.09, 125.04, 360/123.1, 125.17, 125.12, 125.06, 360/125.15, 125.26, 125.19
See application file for complete search history.

(56) References Cited

U.S. PATENT DOCUMENTS

| | | | |
|---|---|---|---|
| 6,972,919 B2 | 12/2005 | Suk | |
| 7,035,046 B1 | 4/2006 | Young et al. | |
| 8,094,418 B2 | 1/2012 | Schreck et al. | |
| 9,082,423 B1 | 7/2015 | Liu et al. | |
| 9,147,407 B2 * | 9/2015 | Tian | G11B 5/332 |
| 9,245,581 B2 | 1/2016 | Tanaka et al. | |
| 9,318,131 B2 * | 4/2016 | Tian | G11B 5/232 |
| 9,343,087 B1 | 5/2016 | Zhou et al. | |
| 2002/0141111 A1 * | 10/2002 | Batra | G11B 5/1278 360/125.17 |
| 2010/0214692 A1 * | 8/2010 | Kief | G11B 5/3156 360/125.03 |
| 2013/0286805 A1 * | 10/2013 | Macken | G11B 5/314 369/13.33 |
| 2015/0002963 A1 * | 1/2015 | Tian | G11B 5/23 360/235.4 |

* cited by examiner

*Primary Examiner* — Allen T Cao
(74) *Attorney, Agent, or Firm* — Hall Estill Attorneys at Law

(57) ABSTRACT

A data writer can have at least a write pole separated from a return pole by a non-magnetic lamination. The non-magnetic lamination may consist of first, second, and third non-magnetic materials that are each different and configured to provide a physical protrusion on an air bearing surface of less than 4 Angstroms.

20 Claims, 4 Drawing Sheets

DATA WRITER GAP MATERIAL WITH DECREASED PROTRUSION

RELATED APPLICATION

The present application makes a claim of domestic priority to U.S. Provisional Patent Application No. 62/197,426 filed Jul. 27, 2015, the contents of which are hereby incorporated by reference.

SUMMARY

A data writer, in accordance with various embodiments, has a write pole separated from a return pole by a non-magnetic lamination. The non-magnetic lamination consists of first, second, and third non-magnetic materials that are each different and configured to provide a physical protrusion on an air bearing surface of less than 4 Angstroms.

DETAILED DESCRIPTION

Demand for data storage devices with increased data storage capacity has emphasized the structural precision of various portions of a data access component, such as a data writer and data reader. For example, relatively small structural deviations from data writer designs can degrade data access performance and jeopardize the operation of an entire data storage device. It has been found that the use of some materials in data access components with reduced physical dimensions can result in unwanted physical protrusions that increase mechanical volatility, which reduces data storage performance. Hence, there is a concerted goal to configure a data access component with materials conducive to minimized physical protrusion in a small scale environment.

Accordingly, a data writer has, in some embodiments, a non-magnetic lamination of at least three different non-magnetic materials between a write pole and a front shield to decrease a physical protrusion of the non-magnetic lamination on an air bearing surface (ABS) and increase planarity of the ABS from the write pole to a return pole. The tuned selection of the respective non-magnetic lamination materials can balance between material hardness and magnetic coercivity of the lamination to provide an equilibrium that provides a more planar air bearing surface without inhibiting data writer performance. The ability to tune the materials, thicknesses, and positions of the respective non-magnetic lamination materials allows the data writer to be customized to accommodate reduced physical dimensions for the data writer and increased data density on an adjacent data storage medium.

Figure 1:
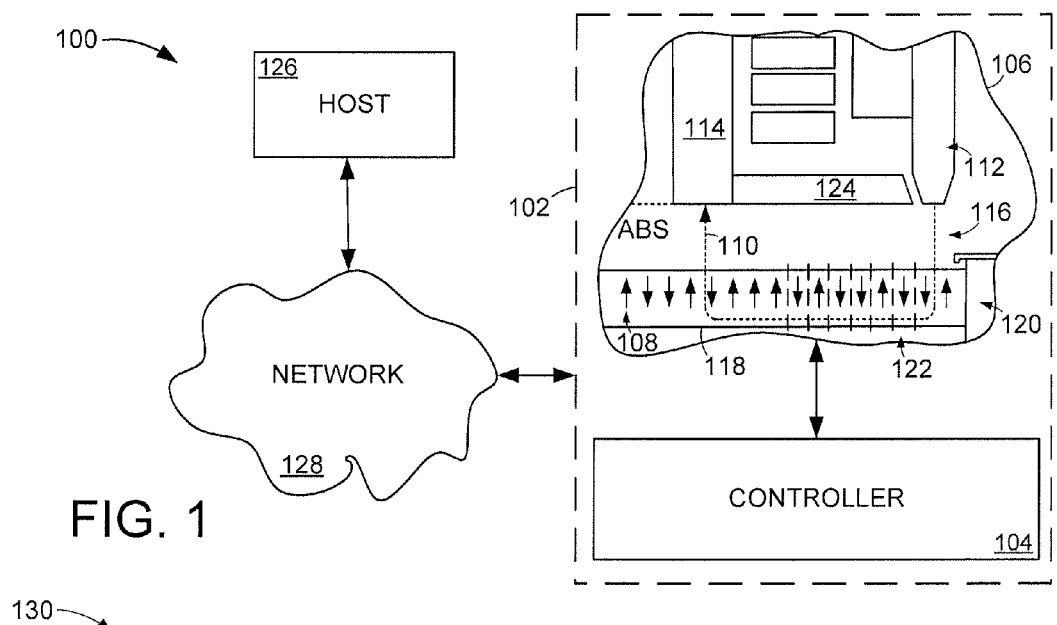
FIG. 1 is an air bearing view line representation of a portion of an example data storage system arranged in accordance with various embodiments.

Although a non-magnetic lamination may be employed in an unlimited variety of data storage components, such as in a data reader, FIG. 1 displays portions of an example data storage system 100 that utilizes one or more data storage devices 102 tuned in accordance with various embodiments. The data storage device 102 has at least one local controller 104, such as a microprocessor, that concurrently or sequentially services portions of one or more data writers 106.

As shown, the local controller 104 directs writing of at least one data bit 108 by forming a writing circuit 110 between a write pole 112 and a return pole 114 across an air bearing 116. Controlled rotation of the data storage medium 118 via the spindle motor 120 and actuated motion of the write pole 112 can write data bits 108 in multiple data tracks 122 across the surface of the data storage medium 118. It is noted that any number of shields 124 can be positioned along uptrack, downtrack, and cross-track directions to absorb and dissipate stray magnetic fields.

Each data storage device 102 of the data storage system 100 may operate individually or collectively via the local controller(s) 104. In some embodiments, one or more data storage devices 102 are wired or wirelessly connected to a remote host 126, such as a node or server, via a network 128. The ability to have multiple data storage devices 102 operating independently and locally or collectively and remotely allows the data storage system 100 to be utilized in a diverse variety of environments, such as in mobile computing environments like smartphones, tablet computers, and laptops.

Figure 2:
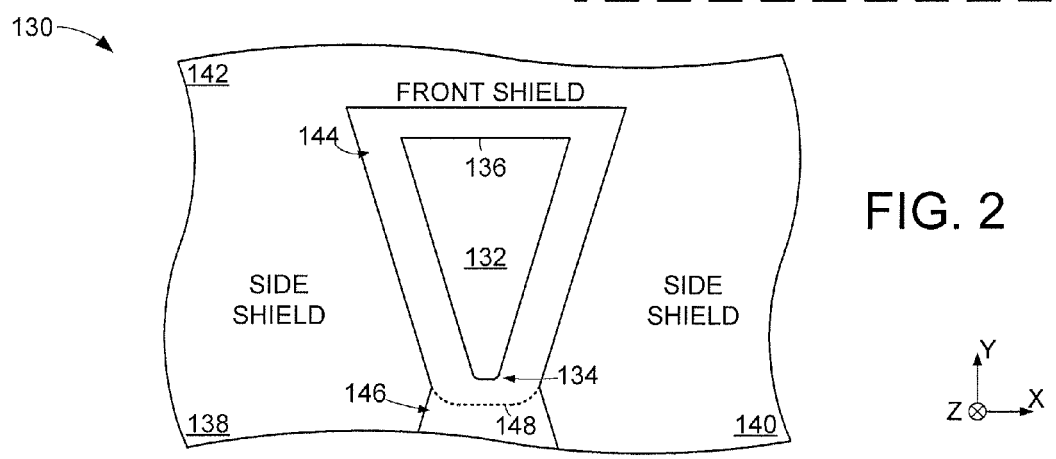
FIG. 2 shows an air bearing view line representation of a portion of an example data writer that may be utilized in the data storage system of FIG. 1.

FIG. 2 displays an air bearing view of a portion of an example data writer 130 that may be employed by the data storage system 100 of FIG. 1 in accordance with some embodiments. The data writer 130 has a main write pole 132 that has a substantially trapezoidal shape with an uptrack leading tip 134 and a downtrack trailing edge 136. The write pole 132 is laterally separated from first 138 and second 140 side shields as well as vertically separated from a front shield 142 by a continuous non-magnetic gap 144. It is contemplated that the side shields 138 and 140 contact or a single layer that wraps around the leading tip 134 at an uptrack region 146, but such configuration is not required as the uptrack region 146 may be filled with non-magnetic materials that separates the side shields 138 and 140, as shown by segmented line 148.

As data density increases and data bits are more closely positioned in data tracks on a data storage medium, the magnetic extent of the write pole 132 needs to get smaller. While various embodiments can tune the construction and configuration of the shields 138, 140, and 142 to provide a reduced magnetic extent for the write pole 132, construction of the non-magnetic gap 144 can result in unwanted physical protrusions that jeopardize operation of the data writer 130 as a whole. That is, despite tuned shields, physical protrusions on the ABS from the non-magnetic gap 144 can mechanically inhibit the data writer 130 from accurately writing data.

Figure 3:
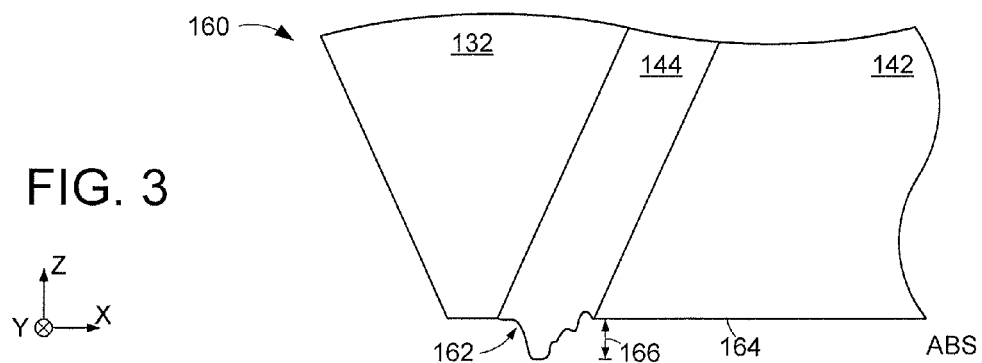
FIG. 3 displays a line representation of a portion of an example data writer constructed in accordance with assorted embodiments.

FIG. 3 illustrates a side view line representation of a portion of an example data writer 160 that suffers from a physically protruding non-magnetic gap in accordance with assorted embodiments. As shown, the material of the non-magnetic gap 144 is not planar at the ABS and has physical protrusions in region 162. Such physical protrusions disrupt the substantially planar ABS 164 and can cause the data writer 160 to erratically fly on an air bearing, which can result in data writing errors. It is noted that the physical protrusions extend from the ABS a distance 166, which may be an average, maximum, or minimum measurement of the non-magnetic gap material protrusions with respect to the front shield 142, write pole 132, and/or return pole.

It is contemplated that the material construction of the non-magnetic gap 144 determines the degree of undulations and protrusions in region 164. While not limiting, the use of materials that have relatively high hardness characteristics, such as Ruthenium and Chromium, can result in larger physical protrusions and greater variance from the ABS 164 after data writer processing. Hence, assorted embodiments tune portions of the non-magnetic gap 144 to reduce the size of physical protrusions on the ABS 164. It is noted that although the physical protrusions are displayed at a trailing edge 136 in FIG. 3, such position is not required or limiting as gap protrusions can be present anywhere around the write pole 132.

Figure 4:
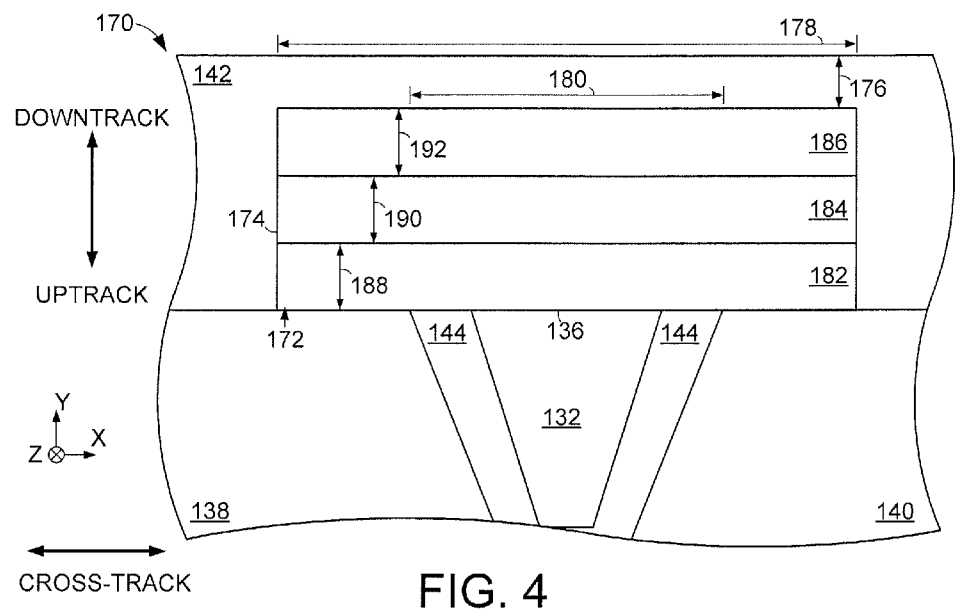
FIG. 4 illustrates an air bearing view line representation of a portion of an example data writer configured in accordance with various embodiments.

With the example data writer 170 of FIG. 4, a non-magnetic gap lamination 172 is positioned between the write pole 132 and front shield 142 to mitigate physical protrusions and provide an increasingly planar ABS. The air bearing view line representation of FIG. 4 displays how the gap lamination 172 is positioned within a letterbox notch 174 defined by a reduced thickness 176 in the front shield 142. The letterbox notch 174 also has a width 178 on the ABS that is greater than the collective width 180 of the write pole 132 and gap material 144 along the X axis while being less than, or equal to, the width of the front shield 142. It is noted that the letterbox notch 174 can be any shape and size that has one or more linear and/or curvilinear sidewalls.

With the ability to tune the shape, size, and position of the gap lamination 172 on the ABS, the risk of magnetic shunting between the write pole 132 and front shield 142 can be reduced without degrading shielding and data writing performance of the data writer 170. In the non-limiting embodiment of FIG. 4, the gap lamination consists of first 182, second 184, and third 186 gap sub-layers that are each different non-magnetic materials to reduce gap protrusions while mitigating unwanted write pole 132 shunting with the front shield 142 on the ABS. That is, the respective sub-layers 182, 184, and 186 can be tuned for material and thickness to be more conducive to writer processing techniques, such as etching and/or polishing, to produce a more planar ABS than if a single gap material, such as Ru or Cr, was used in the letterbox notch 174.

The first sub-layer 182, in some embodiments, is NiRu with 50% Ni and 50% Ru by weight. It is contemplated that a greater Ni weight percentage would increase the magnetic coercivity of the gap lamination 172 and a greater Ru weight percentage would increase the hardness and severity of physical protrusions on the ABS. Hence, a balanced weight percentage for the first sub-layer 182 can provide sufficient softness to allow writer processing techniques to create a substantially planar ABS from the write pole 132 to the front shield 142. The NiRu sub-layer 182 can be complemented by the tuned construction of the second sub-layer 184 as $AlO_X$ and the third sub-layer 186 as a transition metal, such as Ru or Cr.

The combination of the NiRu first sub-layer 182 along with the $AlO_X$ and transition metal sub-layers 184 and 186 provides a non-magnetic letterbox 172 while providing a sufficient seed for growing predetermined crystalline configurations, such as face-centered cubic, in layers deposited on top of the gap lamination 172. The differing materials of the gap lamination sub-layers 182, 184, and 186 allows the non-magnetic, seed, and hardness properties to be adjusted to accommodate the size and writing characteristics of the write pole 132 and shields 138, 140, and 142. The respective sub-layer thicknesses 188, 190, and 192 may also be tuned to be different, or similar, values that are adjusted to tune the performance of the gap lamination 172 and data writer 170 as a whole.

Figure 5:
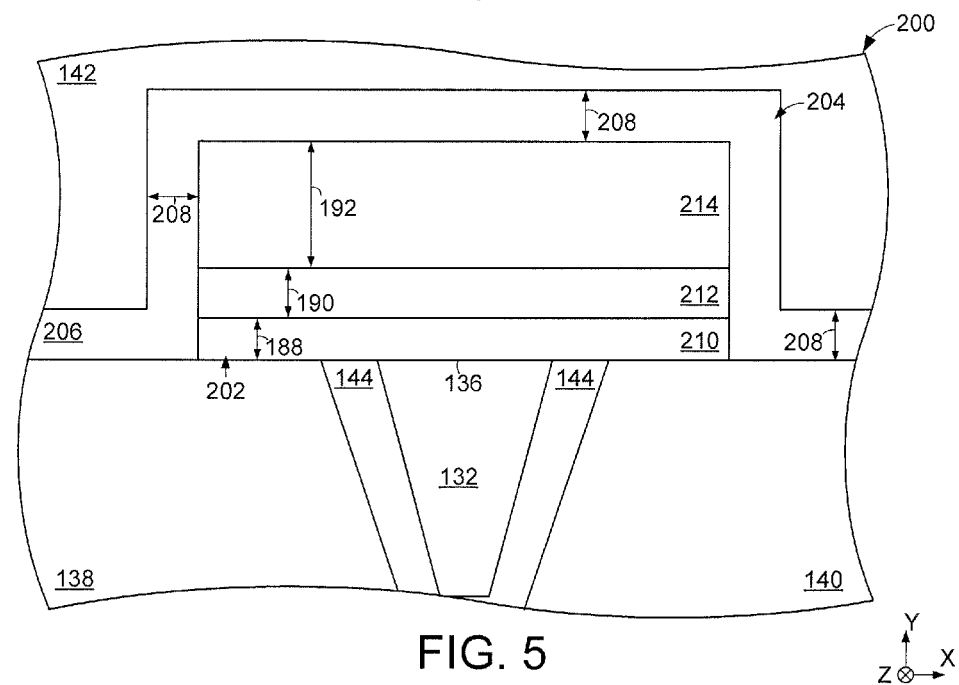
FIG. 5 depicts an air bearing view line representation of a portion of an example data writer arranged in accordance with some embodiments.

FIG. 5 displays an air bearing view line representation of an example data writer 200 arranged in accordance with some embodiments to mitigate physical protrusions while providing optimized data writing performance. The data writer 200 has a gap lamination 202 that contacts the write pole 132 and occupies a letterbox notch 204 in the front shield 142. An insulating layer 206 continuously extends from the first side shield 138 to the second side shield 140 around the gap lamination 202 to separate the front shield 142 from the side shields 138 and 140 as well as the gap lamination 202. It is contemplated that the insulating layer 206 has a uniform or varying separation distance 208, which is defined as the distance from the front shield 142 to the gap lamination 202 or side shields 138/140.

The incorporation of an insulation layer 206 tuned for material and size can supplement the material and thicknesses of the gap lamination sub-layers 210, 212, and 214 to reduce the risk of inadvertent magnetic saturation and the formation of magnetic domain walls in the front 142 and side 138/140 shields. The third sub-layer 214 may, in some embodiments, may be constructed of a combination of a thin transition metal, such as a 1 nm thick layer of Ru, and a thick layer of magnetic material, such as a 57 nm thick layer of CoFe or NiFe. The incorporation of the thick magnetic material into the gap lamination 202 can provide a return pole, such as pole 114 of FIG. 1, or as a complement to the magnetic front 142 and side 138/140 shields.

Figure 6:
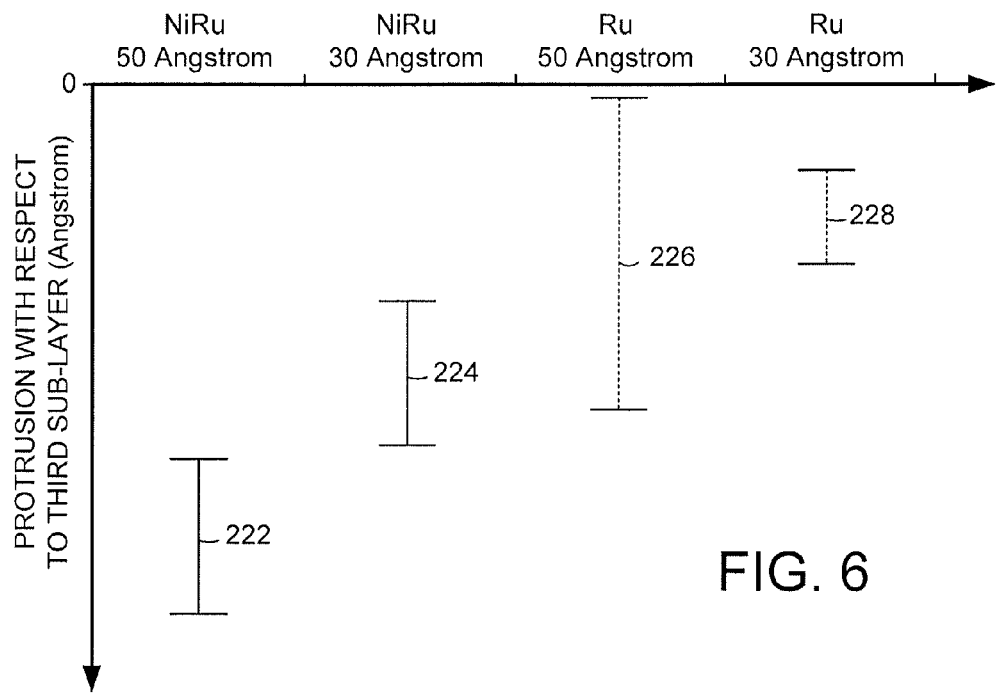
FIG. 6 plots structural data for example data writers constructed and operated in accordance with assorted embodiments.

FIG. 6 plots structural data associated with example data writers constructed with gap laminations tuned for thickness and material in accordance with various embodiments. Solid line 222 represents physical protrusion variability for a NiRu first gap lamination sub-layer having a 50 Angstrom thickness, as deposited, while solid line 224 corresponds with the protrusion variability for the NiRu sub-layer having a 30 Angstrom thickness. Segmented lines 226 and 228 respectively illustrate the protrusion variability for 50 and 30 Angstrom thick Ru magnetic gap layers. That is, lines 226 and 228 represent if no gap lamination is present and instead a single transition metal material is positioned between the write pole and a front shield.

It can be appreciated from FIG. 6 that the a tuned NiRu gap lamination sub-layer provides reduced protrusion variability, such as less than 4 Angstrom protrusion variability with respect to the third gap lamination sub-layer, which allows writer processing to provide a more planar ABS than for large protrusion variability. The ability to control protrusion with sub-layer deposited thickness further allows the ABS topography of a data writer to be customized to balance shielding and data writing performance. In contrast, a single transition metal gap layer can suffer from relatively large height differences that may remain after writer processing techniques.

Figure 7:
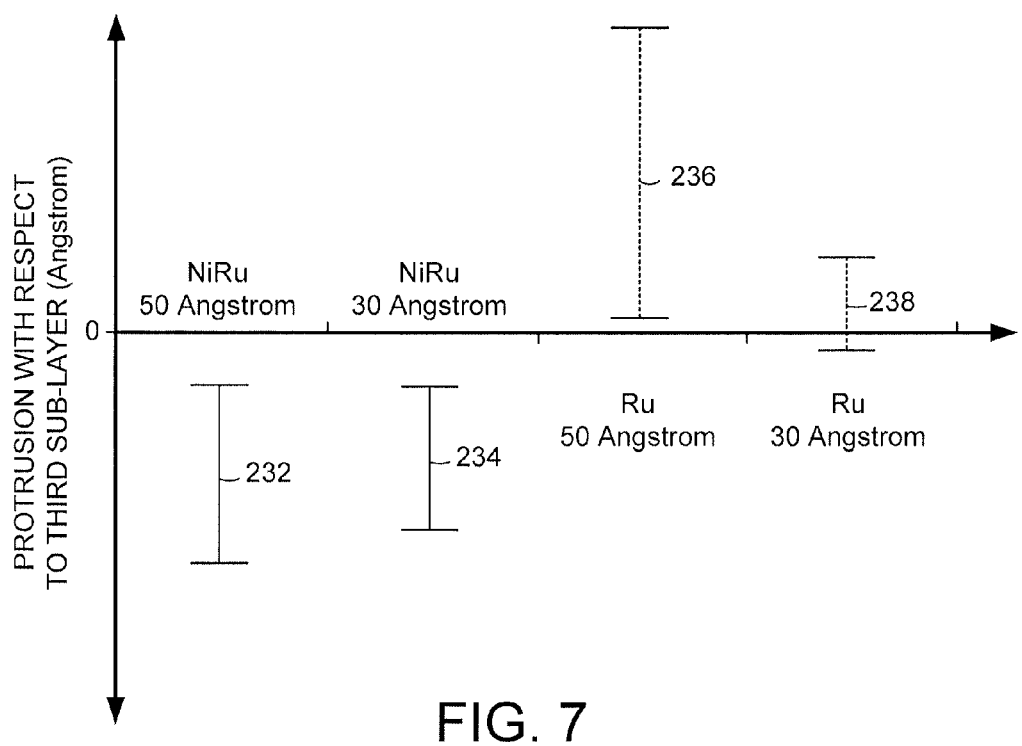
FIG. 7 graphs structural data for example data writers configured in accordance with various embodiments.

FIG. 7 graphs structural data for example data writers configured with gap lamination tuned for thickness and material in accordance with assorted embodiments. Solid lines 232 and 234 respectively correspond with a NiRu first gap lamination sub-layer with 50 and 30 Angstrom thicknesses. Segmented lines 236 and 238 respectively represent 50 and 30 Angstrom thickness for a Ru gap layer. The measurements of FIG. 7 are taken with respect to a return pole on an ABS and illustrate how the gap lamination has a small and consistent protrusion variability for a NiRu gap lamination sub-layer compared with a single Ru gap layer. The consistent protrusion values for different deposited sub-layer thickness allows writer processing to more precisely be set to provide a substantially planar ABS.

Figure 8:
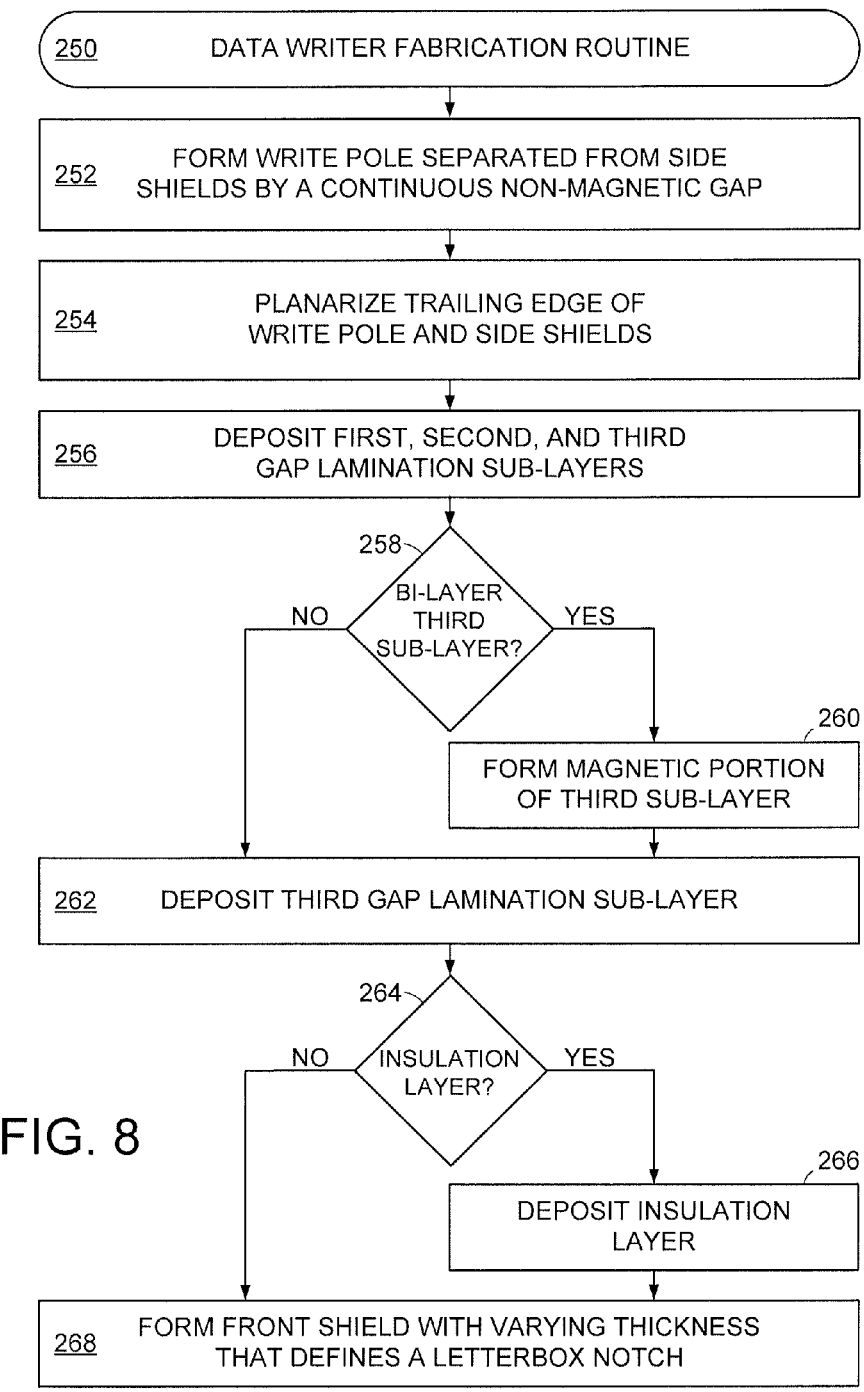
FIG. 8 provides a flowchart of an example data writer fabrication routine that may be conducted in accordance with some embodiments.

FIG. 8 provides a flowchart for an example data writer fabrication routine 250 that may be carried out in accordance with various embodiments. The routine 250 may execute any number of steps and decisions to form a write pole separated from side shields by a non-magnetic gap, which is represented collectively by step 252. The non-magnetic gap can be one or more layers of similar or dissimilar material, such as Alumina or chromium, that continuously extend to opposite sides of the trailing edge of the write pole around a tip of the write pole.

A trailing edge of the write pole is planarized with the side shields and non-magnetic gap in step 254 to provide a continuous linear surface for step 256 to successively deposit at least first, second, and third gap lamination sub-layers. The respective gap lamination sub-layers are tuned for material, thickness, and width on the ABS to provide physical protrusions less than a predetermined threshold, such as 4 Angstroms, with respect to a return pole and/or a front shield. For example, the first sub-layer can be deposited as NiRu with a 50 or 30 Angstrom pre-etching thickness on the ABS while the second sub-layer is deposited with as $AlO_X$ having a similar or dissimilar pre-etch and post-etch thickness on the ABS.

The deposition of the third gap lamination sub-layer in step 256 can produce a transition metal layer, such as Ru, that has a post-etch thickness of approximately 1 nm. It is noted that the respective gap lamination sub-layers can have similar or dissimilar widths on the ABS, which may involve additional patterning steps. As a non-limiting example, the first, second, and third sub-layers can continuously extend from a first side shield to a second side shield across the write pole in the shape of a letterbox notch, such as rectangular or square shape.

It is possible to construct the third sub-layer as a bi-layer. Decision 258 evaluates and determines if a supplemental layer is to be formed atop of the transition metal material of the third sub-layer. If a bi-layer is to be formed, step 260 forms a magnetic portion of the third sub-layer, which may involve a magnetic compound, like CoFe or NiFe, with a greater thickness pre-etching and post-etching than the transition metal portion of the third sub-layer. At the conclusion of step 260 or in the event decision 258 determines a magnetic portion is not to be constructed, decision 262 assesses whether an insulating layer is to be formed proximal the gap lamination.

At least one insulation layer is then deposited in step 264 if decision 262 chooses an insulation layer. The insulation layer may be constructed of material that is similar or dissimilar than any of the gap lamination sub-layers. In some embodiments, the insulation layer continuously extends cross-track to opposite sides of the write pole to separate the side shields and gap lamination from a front shield deposited in step 266 by at least a predetermined distance. That is, the insulation layer may have a varying or uniform thickness that matches the shape of the letterbox notch shape of the gap lamination.

The deposition of the insulation layer, or if no insulation layer is chosen in decision 262, advances routine 250 to step 266 where a front shield is formed with a varying thickness to define the letterbox notch and continuously extend to multiple different sides of the gap lamination. It is noted that the various aspects of routines 250 are not required or limiting and any portion can be changed and removed just as additional aspects can be incorporated.

Through the various embodiments of the present disclosure, a gap lamination is tuned for material and size between a write pole and a front shield of a data writer to mitigate physical protrusions on the ABS after writer processing. The incorporation of materials like NiRu into the gap lamination can provide adequate non-magnetic gap characteristics while increasing the ability of the gap lamination to be planarized during writer processing. The ability to customize the materials of the gap lamination can be complemented by an insulating layer that adjusts the shielding characteristics of a front shield and decreases the risk of inadvertent shunting between the front shield and write pole.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a write pole separated from a front shield by a non-magnetic lamination on an air bearing surface (ABS), the non-magnetic lamination comprising a first non-magnetic sub-layer disposed between and contacting second and third non-magnetic sub-layers, the first, second, and third non-magnetic materials each being different and configured with a physical protrusion on the ABS of less than 0 Angstroms with respect to a return pole on the ABS.

2. The apparatus of claim 1, wherein the first non-magnetic sub-layer comprises NiRu with 50% Ni and 50% Ru by weight.

3. The apparatus of claim 1, wherein the second non-magnetic sub-layer comprises $AlO_x$.

4. The apparatus of claim 1, wherein the third non-magnetic material comprises Ru.

5. The apparatus of claim 1, wherein the first, second, and third non-magnetic sub-layers have a common thickness on the ABS, the common thickness measured parallel to a downtrack direction.

6. The apparatus of claim 1, wherein the first, second, and third non-magnetic sub-layers have different thicknesses on the ABS, each thickness measured parallel to a downtrack direction.

7. The apparatus of claim 6, wherein the third non-magnetic sub-layer is separated from the write pole by the first and second non-magnetic sub-layers and has a greater thickness than the first or second non-magnetic sub-layers.

8. The apparatus of claim 1, wherein the front shield contacts first and second side shields on opposite sides of the write pole on the ABS.

9. The apparatus of claim 1, wherein the second non-magnetic sub-layer contacts first and second side shields on opposite sides of the write pole.

10. An apparatus comprising a write pole separated from a front shield by a non-magnetic lamination on an air bearing surface (ABS), the non-magnetic lamination comprising different first, second, and third non-magnetic sub-layers, the first non-magnetic sub-layer disposed between and contacting the second and third non-magnetic sub-layers, the non-magnetic lamination configured with a physical protrusion on the ABS of more than 0 Angstroms and less than 4 Angstroms.

11. The apparatus of claim 10, wherein an insulating layer continuously extends to contact each non-magnetic sub-layer and separate the non-magnetic lamination from the front shield.

12. The apparatus of claim 11, wherein the insulating layer has a uniform thickness as measured as a distance from the non-magnetic lamination to the front shield.

13. The apparatus of claim 12, wherein the distance is measured parallel to a downtrack direction in a first portion of the insulating layer and measured parallel to a cross-track direction in a second portion of the insulating layer.

14. The apparatus of claim 10, wherein the insulating layer comprises a non-magnetic material different from the first, second, and third non-magnetic sub-layers.

15. The apparatus of claim 10, wherein the insulating layer separates the front shield from first and second side shields on the ABS.

16. An apparatus comprising a write pole separated from a front shield by a non-magnetic lamination on an air bearing surface (ABS), the non-magnetic lamination positioned in a letterbox notch of the front shield and comprising first, second, and third non-magnetic sub-layers, the second sub-layer disposed between and contacting the first and third non-magnetic sub-layers, the first, second, and third non-magnetic materials each being different and configured with a physical protrusion on an air bearing surface (ABS) of more than 0 Angstroms and less than 4 Angstroms.

17. The apparatus of claim 16, wherein the front shield is aligned with a longitudinal axis of the write pole and positioned downtrack from the write pole.

18. The apparatus of claim 16, wherein the letterbox notch is a region of reduced front shield thickness.

19. The apparatus of claim 16, wherein the letterbox notch has a notch width on the ABS that is wider than a collective width of the write pole and a gap layer on the ABS.

20. The apparatus of claim 19, wherein the notch width and collective width are each measured parallel to a cross-track direction, the cross-track direction perpendicular to a downtrack direction.

* * * * *